United States Patent [19]

Lazzari

[11] 4,246,474

[45] Jan. 20, 1981

[54] METHOD AND APPARATUS FOR READING MAGNETICALLY CODED DATA

[75] Inventor: Jean-Pierre Lazzari, Montfort l'Amaury, France

[73] Assignee: Compagnie Internationale pour l'Informatique, Paris, France

[21] Appl. No.: 35,482

[22] Filed: May 3, 1979

[30] Foreign Application Priority Data

Jun. 16, 1978 [FR] France ............................. 78 18039

[51] Int. Cl.³ .................... G06K 7/08; H04N 5/33; G11C 11/00
[52] U.S. Cl. ................................. 235/450; 360/113; 365/158
[58] Field of Search ................ 235/449, 450; 360/113, 360/2; 365/158; 340/146.3 Z

[56] References Cited

U.S. PATENT DOCUMENTS

| 3,848,217 | 11/1974 | Lazzari | 338/32 R |
| 4,079,360 | 3/1978 | Ookubo et al. | 235/449 |

Primary Examiner—Daryl W. Cook

Attorney, Agent, or Firm—Kerkam, Stowell, Kondracki & Clarke

[57] ABSTRACT

A method and apparatus for reading data defined by a plurality of magnetic elements which emit respective predetermined external magnetic fields consists in subjecting an anisotropic magnetoresistive device carrying a substantially constant electrical current to the effect of the external magnetic fields, polarizing in said magnetoresistive device by a magnetic polarizing field in such a way that the direction of magnetization and the axis of easy magnetization of the magnetoresistive material of the said device form a given angle between them, defining the maximum desired value of the said external magnetic fields to which the said magnetoresistive device will be subjected, and making the value of the said angle correspond substantially to the modulus of the sum of the said maximum desired value of external magnetic field and the magnitude of the demagnetizing magnetic field which is set up by the said magnetoresistive medium in response to the said external magnetic field having the said maximum desired value.

7 Claims, 11 Drawing Figures

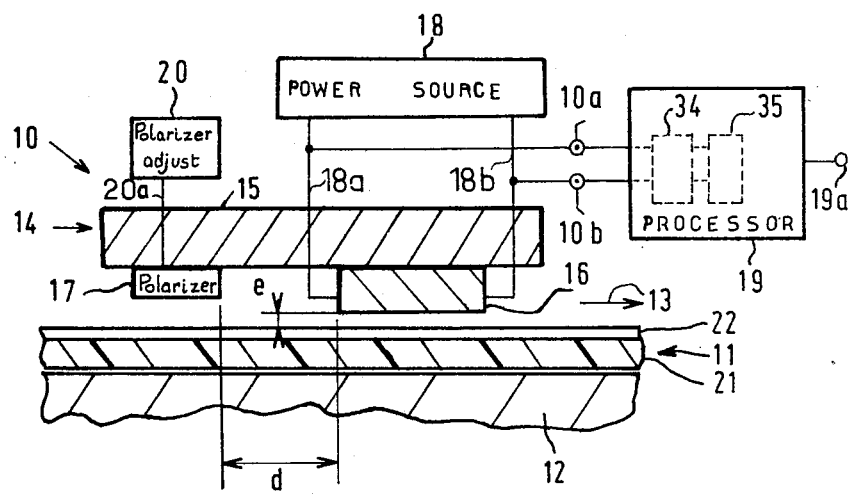
FIG 1
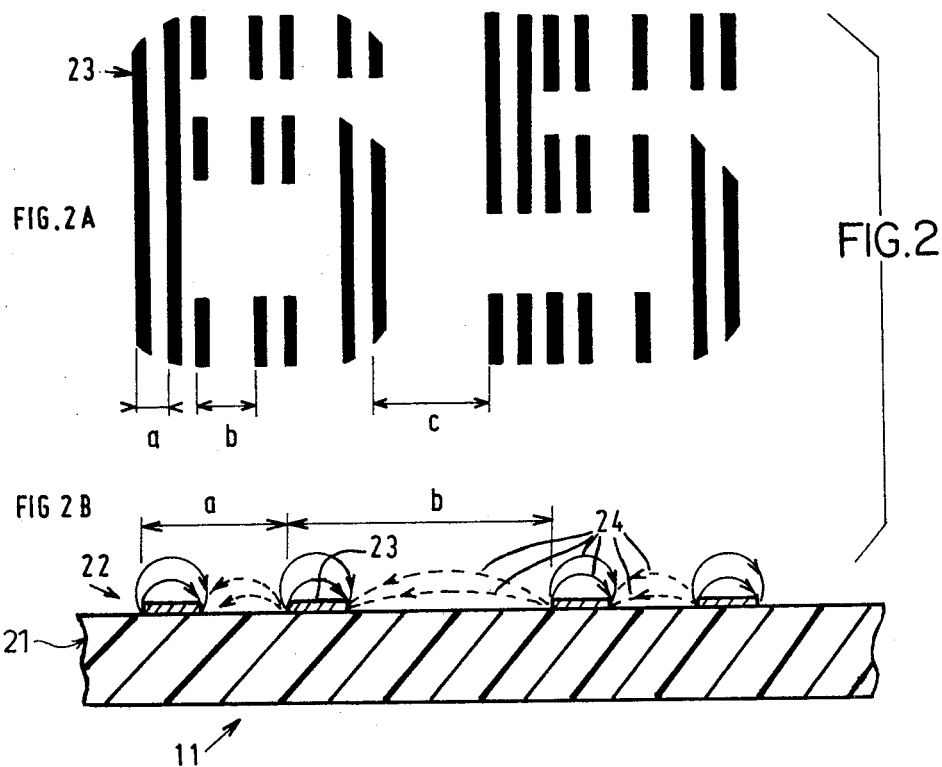
FIG.2A
FIG.2B
FIG.2

METHOD AND APPARATUS FOR READING MAGNETICALLY CODED DATA

BACKGROUND OF THE INVENTION

1. Field of the Invention

The invention relates to a method and apparatus for reading magnetically coded data.

2. Description of the Prior Art

The automatic processing of data carried by documents requires the data to be written in a form in which it can easily be detected and recognized by the processing machine. Magnetic coding of the data by the application of magnetic elements to the documents has the advantage of concentrating the data at a high density in an analog or digital representation, of making it easier both to write and to read, and of involving relatively simple, low-cost materials and equipment.

Magnetic coding of this kind is widely used at present, in particular by organizations which deal with money, to record on the individual documents (such as checks) which are made available to customers to perform predetermined operations; the usual details such as the code numbers of a bank, of the branch, of the drawer's account and of the document.

A plurality of analog or digital codes have been adopted by organizations which deal with money. In Europe, and particularly in the Latin countries, the most widely used code is that known by the abbreviation CMC7 (7 element coded magnetic character). This code provides a way of representing alphabetic and numerical data which has the advantage of being readable both by a machine and by an untrained person. Each group of seven elements are arranged vertically parallel to one another on the document, as shown, for example, in FIG. 2A herein, and suggests the shape of the character in question. However, for the machine, the seven elements making up the character are separated from one another by long (b) or short (a) intervals which are predetermined by the character concerned. In addition, each character is separated from its neighbor by an interval different from the aforenoted (a) and (b) intervals, which intervals are called a very long (c) interval or an inter-character interval.

As an example, the figure "O" is defined by reading in succession from left to right, two short intervals, two long intervals, and two short intervals. The figure "1" is defined by one long interval, three short intervals, one long interval and one short interval. The letter "A" is defined by one short interval, one long interval, and four short intervals, and the letter "Z" by two short intervals, two long intervals, and two short intervals. The CMC7 code is well known and will not be described in detail herein.

The decoding devices process information coming from magnetic readers, and to enable them to do this, the elements (also called bars) of the characters are printed on the documents in an ink which can be permanently magnetized, while the readers are preceded by a magnetizing device which is designed to saturate the elements magnetically. The elements are thus capable of generating electrical pulses in the reader and the decoding devices then process these pulses digitally to reconstitute the data in analog form.

Another digital code, which tends to find favor for more use at present on credit cards, is that generally referred to as the "dual frequency code" or "Aiken code". This is a purely magnetic digital code formed by a continuous succession of equal magnetized cells. In this succession, the cells representing zero bits are magnetized in their entirety in the direction in which the cells succeed one another. Cells representing one bits are magnetized in halves in two opposing senses in the said direction. In addition, each cell is differentiated from the adjoining cell by a reversal of its sense of magnetization.

The reading of data written in this code consists, on the one hand, of detecting the magnetization of each cell by generating, in a reader, alternating electrical pulses whose length varies as a function of the items of binary data defined by the cells, and on the other hand of making measurements of these lengths to reconstitute the corresponding data.

The English speaking countries have, for their part, developed an entirely analog code called the E13B code. This code is the one most widely used throughout the world. In this code, each character is written on the document in a predetermined form which is well suited to optical decoding. However, an optical reader is a relatively complex and expensive instrument compared with a magnetic reader. However, when written in a magnetizable ink and then magnetized before being read, characters so coded are capable of producing in a magnetic reader electric signals specific to each character.

Magnetic decoding is currently performed on one of the following two principles.

The first method of reading consists in passing the document in front of a magnetic reader, which reacts to variations in magnetic flux to produce a corresponding electrical signal. The detected signal is thus proportional to the differential coefficient of the variation in the magnetic induction field with respect to time, that is to say, to the relative speed of passage of the document. Thus, correct signals can be obtained from readers of this kind only if the speed of passage is relatively high.

The second method of reading has the advantage of being independent of the speed of movement of the documents past the reader. In this case the readers have magnetoresistors as their detecting elements. These latter are electrical resistors which are deposited on a substrate of insulating material in the form of thin films or layers of extremely small thickness (a few hundreths of an Angstrom to a few microns) and whose resistance R varies by an amount $\Delta R$ proportional to the strength of the magnetic field which they receive. In this way, if they carry a constant current I, the change in resistance $\Delta R$ will be reflected by a change in voltage $\Delta V = I \cdot \Delta R$. The ratio $\Delta R/R$ is called the coefficient of magnetoresistance.

Magnetoresistors in current use are formed from an anisotropic magnetic material. In such a material, two axes are defined, namely, the axis of easy magnetization and the axis of hard magnetization. The magnetic permeability $\mu$ of the magnetic material is at a maximum in the direction of the axis of hard magnetization and at a minimum in the direction of the axis of easy magnetization.

Any magnetic field $H_e$ generated externally to the magnetoresistor and applied thereto creates in it a demagnetizing field $H_{de}$ which tends to counteract the field $H_e$. The magnetoresistor reacts to the magnetic exciting field H, whose modulus is that of the sum ($/\vec{H}/ = /\vec{H}_e + \vec{H}_{de}/$) of the corresponding fields $\vec{H}_e$ and $\vec{H}_{de}$.

A magnetoresistive material is also characterized by a specific magnetoresistance curve. This defines the changes in the resistance of the material as a function of the magnetic exciting fields H to which the material is sensitive. The curve is normally in the shape of a bell which is symmetrical with reference to the sign of the exciting fields, that is to say, about the axes carrying the values of resistance.

Because of this symmetry, alternating changes in the exciting field H about the value zero result in non-alternating changes in the resistance of the material. To overcome this disadvantage, the magnetoresistor is polarized by means of an external magnetic polarizing field $H_p$ which, together with the corresponding demagnetizing magnetic field $H_{dp}$ forms a magnetic exciting field $\vec{H}_t = \vec{H}_p + \vec{H}_{dp}$ termed the translatory field. The effect of this field is in fact to shift the curve for magnetoresistance along the axis of the magnetic exciting filds H. Detection thus takes place about a central point situated on one side of the curve.

Corresponding to this translatory shift is an angle of polarization $\ominus$ between the magnetization vector of the magnetoresistor and its axis of easy magnetization. This angle varies with the value of the modulus of the polarizing field $H_p$ between 0° and 90°.

It appeared obvious and natural to make the value of the angle of polarization approximately 45°, on the one hand because of the symmetry, which was favorable to the detection of an alternating signal, and on the other hand because of the high sensitivity to external magnetic fields which the magnetoresistive material has with this value. It is, in fact, approximately at this point that the sign of the curvature of each side of the magnetoresistance curve changes. An example of magnetic detection with 45° polarization is described in U.S. Pat. No. 3,848,217.

Detection of this kind has been shown to have the following disadvantages. Firstly, when the magnetic exciting field to be detected (not the magnetic polarizing field), which is also referred to by the name "magnetic signal field", has a modulus greater than that of the translatory field $H_t$, distortion exists in the voltage signal taken from the terminals of the magnetoresistor. Secondly, a reduction in the resolution of the detection is found. Resolution is the ratio between the peak-to-peak amplitudes of the high frequency signals relative to the low frequency signals. The distortion in the detected signals, combined with the reduction in resolution, reduces the reliability with which the data is read. Given that the detecting threshold level for the electrical circuits which process the signals from the magnetoresistor must be reduced by an appropriate amount, the decoding circuits are made more susceptible to magnetic interference fields.

SUMMARY OF THE INVENTION

The invention overcomes these disadvantages by reason of the fact that it preserves the high-level detected signals both from any alteration in the shape of the signals (distortion) and from any reduction in resolution, and by of the devices for processing the data to parasitic interference.

The method according to the subject invention for reading data defined by a plurality of magnetic elements which emit respective predetermined external magnetic fields consists in subjecting an anisotropic magnetoresistive device carrying a substantially constant electrical current to the effect of the said external magnetic fields, polarizing the said magnetoresistive device by a magnetic polarizing field in such a way that the direction of magnetization and the axis of easy magnetization of the magnetoresistive material of the said device form a given angle between them, defining the maximum desired value of the said external magnetic fields to which the said magnetoresistive device will be subjected, and making the value of the said angle correspond substantially to the modulus of the sum of the said maximum desired value of the said external magnetic fields and the magnitude of the demagnetizing magnetic field which is set up by the said magnetoresistive device in response to the said external magnetic field having the said maximum desired value.

In accordance with the present invention, apparatus for reading data defined by a plurality of magnetic elements carried by a data carrier and emitting respective predetermined external magnetic fields corresponding to the said data, comprises a source of substantially constant electrical current, at least one anisotropic magnetoresistive reading device coupled to the said source and adapted to react to magnetic exciting fields, each determined by the vector sum of one of the said external fields which is received by the said magnetoresistive device and the demagnetizing magnetic field which is set up by the magnetoresistive device in response to the said external magnetic field, and whose resistance normally varies, as a function of the said exciting fields, in accordance with a bell curve which is symmetrical with reference to the sign of the said exciting fields, and a polarizing means for emitting a magnetic polarizing field and disposed to apply this polarizing field to the said magnetoresistive device in such a way as to shift the said bell curve in translation along the axis carrying the values of the said exciting fields by a value of magnetic field corresponding substantially to the maximum value of the modulus of the said magnetic exciting fields to which the magnetoresistive device is capable of reacting.

BRIEF DESCRIPTION OF THE DRAWINGS

The features and advantages of the invention will be more clearly apparent from the following description, which is given with reference to the accompanying drawings.

In the drawings:

FIG. 1 is a view, partly in block-diagram form and partly in schematic cross-section, of an embodiment of magnetic reading apparatus according to the invention;

FIG. 2 is divided into two separate illustrations made up of FIGS. 2A and 2B wherein FIG. 2A illustrates two CMC7 coded characters, and FIG. 2B is a schematic cross-sectional view of an embodiment of data carrier bearing CMC7 coded characters;

FIG. 3 is a composite illustration made up of FIGS. 3A, 3B, 3C and 3D wherein FIG. 3A shows an example of dual frequency of Aiken coding; FIG. 3B is a numerical representation of the cells making up the code shown in FIG. 3A; FIG. 3C is a schematic cross-sectional view of a data carrier carrying cells representing the Aiken code shown in FIGS. 3A and 3B; and FIG. 3SD shows two examples of signals which can be obtained from the carrier of FIG. 3C by means of a prior art apparatus (the broken line curves), and one example of a signal that can be obtained from the carrier of FIG. 3C by the present invention as illustrated in FIG. 1 (the solid line curve).

DESCRIPTION OF THE PREFERRED EMBODIMENTS

Figure 3:
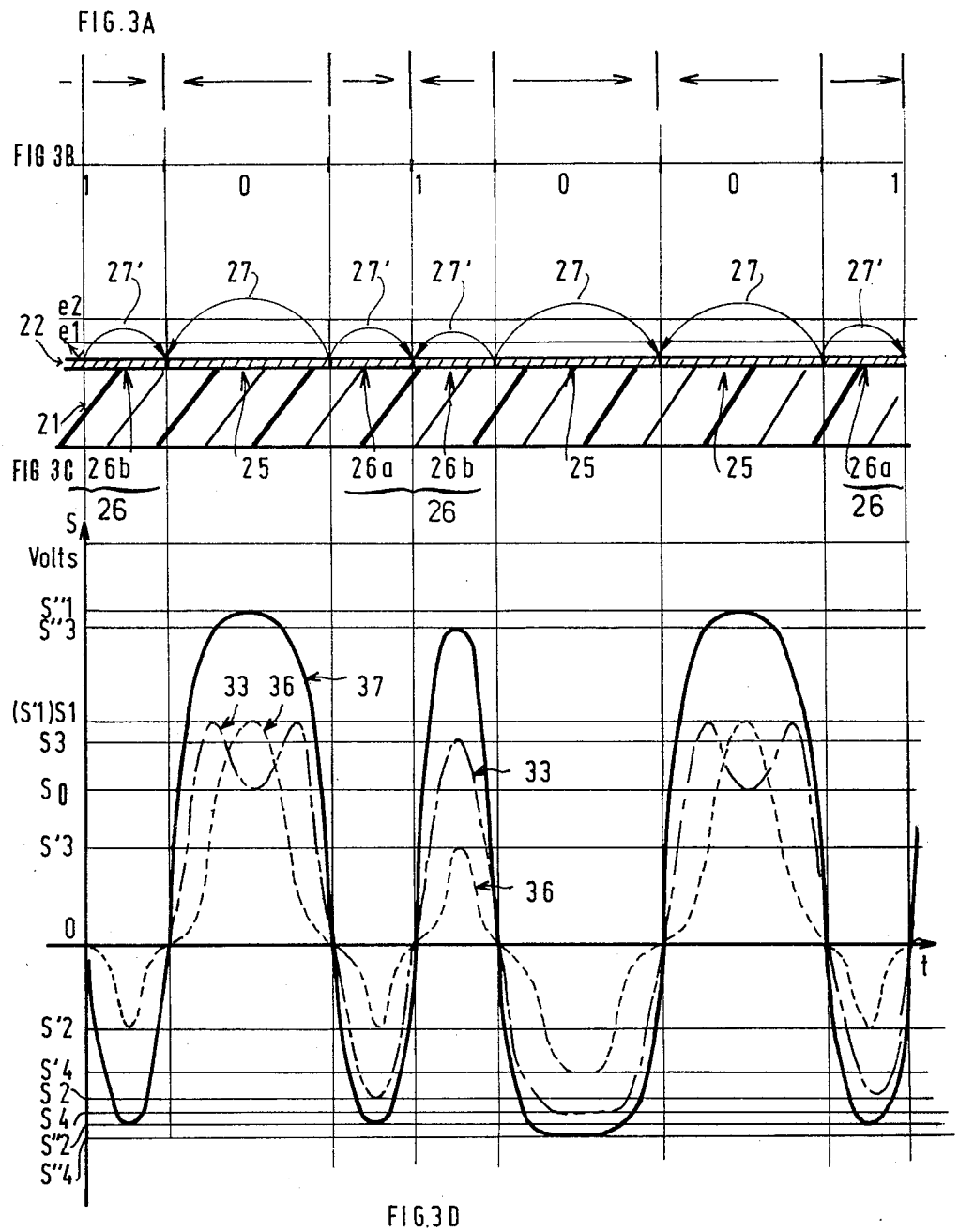

Reference will first of all be made to FIG. 1, which shows an embodiment of apparatus 10 according to the invention for reading data carried by a data carrier 11, such as a check, a credit card, etc.

The apparatus 10 comprises a suitable platform or table 12 across which a data carrier 11 is caused to move in a predetermined direction 13 between the table and a magnetic reading device 14. Reading device 14 is formed in particular by a plate 15 carrying at least one magnetoresistor 16 and a polarizing unit 17, and a source 18 of substantially constant electrical current which feeds this current through the magnetoresistor 16 via an electrical circuit comprising two wires 18a and 18b.

The voltage at the terminals of the magnetoresistor is taken or read from the two output terminals 10a and 10b of the reading apparatus 10, which are connected to respective ones of the two wires 18a and 18b. These two terminals are connected to the input end of a decoding unit 19 which processes the signal coming from the magnetoresistor 16, so as to reconstitute at its output terminal 19a the data carried by the carrier 11.

The general structure of the apparatus 10 which has just been described is well known. It is, for example, described in detail in my U.S. Pat. application No. 899,217, now U.S. Pat. No. 4,184,631, which was filed Apr. 24, 1978, and which is assigned to the assignee of the present invention. It will be seen that the principal feature of the invention lies in the manner of an added device 20 for adjusting polarization of the apparatus 10. The function of the polarizing adjuster means 20 will become clear from the subsequent description of the method of reading according to the invention.

The data carrier 11 is made up of a non-magnetic substrate 21 (made of paper or a plastics material, for example) which carries on one of its faces a magnetic data layer 22 made up of a plurality of magnetic elements arranged in accordance with a given code which emit respective predetermined external magnetic fields corresponding to the required data.

FIG. 2A shows two characters 6 and 5 in the CMC7 code. From FIG. 2A it can be seen that characters written in this code are all formed from seven vertical, parallel elements or bars 23 which are selectively cut away in such a way as to represent the shape of the corresponding character. Thus, the figure 65 can be read. The bars 23 making up each character are also spaced apart from one another by short intervals a or long intervals b in a configuration specific to each character. It will be recalled that the intervals are measured between the same edges of pairs of adjoining bars. In addition, the characters are spaced apart from one another by a very long interval c, which is also measured between the same edges of pairs of adjoining bars separated by that interval.

A carrier 11 of CMC7 coded data is illustrated in FIG. 2B. The elements which make up the magnetic layer 22 on the carrier 11 are bars 23 as shown in FIG. 2A. They are generally written on the substrate 21 in a magnetizable ink. One method of reading data on this nature is described in particular in the above-mentioned U.S. patent application, Ser. No. 899,917, now U.S. Pat. No. 4,184,631. The reading apparatus disclosed therein is similar to the apparatus 10 shown in FIG. 1, except for the means 20 for adjusting polarization. The polarizing unit 17 forms a device for magnetizing the bars 23. Device 20 is connected to polarizing unit via a connecting element 20a which may be a conductor if the adjustment is made electrically or a suitable mechanical linkage if the adjustment is made mechanically. Thus, as bars 23 pass under the unit 17, the bars 23 are magnetized and thus emit external fields 24 in the manner shown in FIG. 2B. In this figure, the field lines are shown as solid lines and loop back to the bar concerned and are called upon to exert an influence on the magnetoresistor 16. The field lines shown as broken lines refer to the inter-bar fields which preferably will not exert any effect on the magnetoresistor 16. These requirements are in particular met by adjusting the separation or spacing e between magnetoresistor 16 and the magnetic layer 22 on the carrier 11 to be read (FIG. 1). In addition, the distance d between the polarizing unit 17 and the magnetoresistor 16 determines the values of the polarizing field, as is described in detail in the above-mentioned patent application Ser. No. 899,217, now Patent No. 4,184,631.

The invention could very well be described with reference to the CMC7 code. However, so that the features and advantages of the invention can be more clearly brought out, and to show that the invention operates with other types of code, the invention will be described with reference to the Aiken code. FIGS. 3A and 3B illustrate the nature of this code, while FIG. 3C illustrates in section the corresponding form of the carrier 11.

Referring to these three figures, it can be seen that data is represented by the Aiken code in an entirely digital binary form, by means of juxtaposed cells 25, 26 of equal lengths. The cells 25 represent zero information and are magnetized in their entirety in the direction in which the cells succeed one another, while the cells 26 representing one information are magnetized in halves 26a, 26b in two opposing senses in the same direction as before. It will also be seen that adjoining fields are opposed to one another. FIG. 3C also shows the isomagnetic lines 27, 27' for the external fields emitted respectively by cells 25 and by cells 26a and 26b. Because of the unequal length of magnetization of cells 25 and 26a, 26b, the highest point of field lines 27 is higher than that of field lines 27'.

Figure 5:
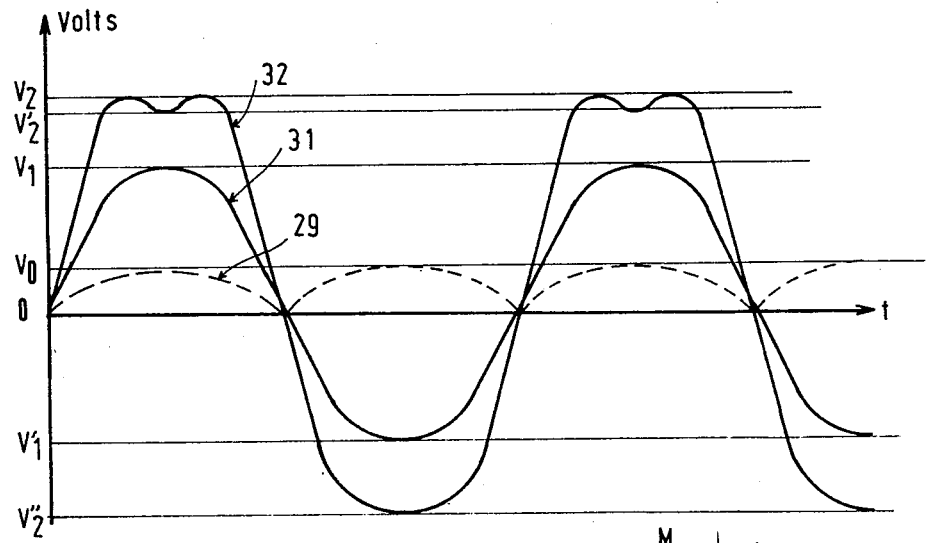
FIG. 5 illustrates three waveforms which can be obtained from a prior art reading apparatus.
Figure 6:
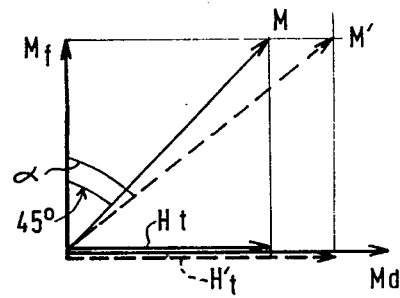
FIG. 6 is a vector representation of the prior art manner of polarization on the one hand and of a manner of polarization according to the invention on the other.
Figure 7:
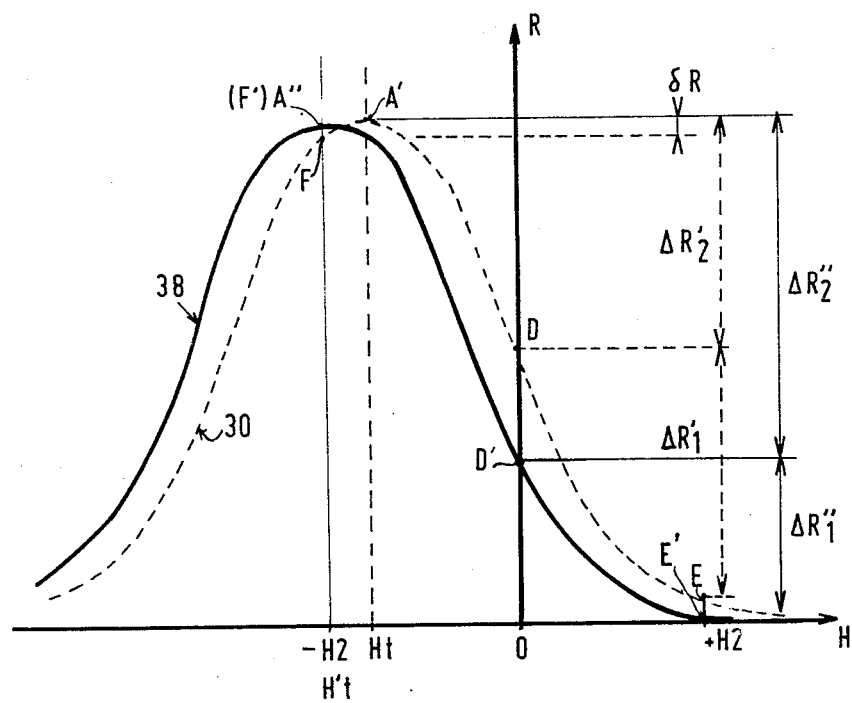
FIG. 7 illustrates a mode of operation of a reading apparatus according to the invention as shown, for example, in FIG. 1.

In order to explain the generation of the read signals shown in FIG. 3D from the data carrier shown in FIG. 3C, reference will first be made to the manner of polarizing the magnetoresistive device of the reading apparatus 10 as known in the prior art (FIGS. 4 to 6) and thereafter with the manner of polarization according to the invention (FIGS. 7 and 8).

Figure 4:
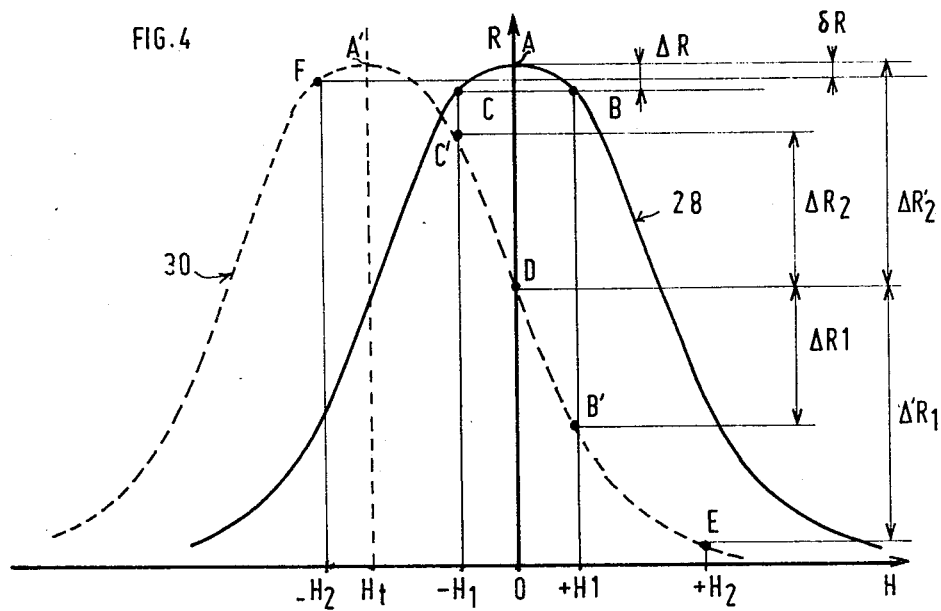
FIG. 4 illustrates the operation of a prior art magnetic reading apparatus employing magnetoresistors, on the basis of a characteristic magnetoresistance curve similar to that of FIG. 1.

Referring to FIG. 4, the solid line curve 28 represents the change in the resistance R of a given magnetoresistive material as a function of the intensity of the magnetic exciting field H to which this material is subjected by an external magnetic field $H_e$ such as 24, 27 or 27' (FIGS. 2B and 3C). Curve 28 is in the shape of a bell which is symmetrical with reference to the sign of the field H. Consequently, resistance decreases when the strength of the received field increases, irrespective of the sign of these fields. Maximum resistance is reached at a point A situated on the axis carrying the values of resistance.

Let it now be assumed that the magnetoresistor is subjected to an alternating sinusoidal field of amplitude $H_1$ about FIG. 4 shows that the changes in the resistance R will take place about axis O-A between points B and C, corresponding to a maximum change $\Delta R$. If the magnetoresistor was caused to carry a constant current and if the changes in the voltage V at the terminals 10a and 10b (FIG. 1) of the magnetoresistor were plotted, the broken-line curve 29 in FIG. 5 would be obtained. It can be seen that the signal obtained is a continuous voltage signal of which the half-cycles have a value $V_o$, corresponding to the change in resistance $\Delta R$.

To enable an alternating change in the field received by the magnetoresistor to be converted by the latter into a similarly alternating signal, the resistor is polarized by having applied to it an external magnetic polarizing field $H_p$ in order to induce in it a translatory field $H_t$ which moves the curve 28 to the position 30 shown in broken lines in FIG. 4. If, as indicated, what is called an external field is a magnetic field other than the fields involved in polarization, the translatory movement means that the resistance R of the magnetoresistor in the absence of any external field is that represented by point D on the right-hand side of curve 30. The effect of the translation is shown in a more qualitative manner in FIG. 6. In this figure, vectors $\vec{M}_f$ and $\vec{M}_d$ represent the axes of easy and hard magnetization respectively of the anisotropic magnetoresistive material used in an apparatus for reading magnetic data. In the absence of a polarizing field the magnetization vector $\vec{M}$ is normally situated along the axis of easy magnetization $\vec{M}_f$. After the appearance of a polarizing field along the axis of hard magnetization, the magnetization vector $\vec{M}$ is represented by the vector combination $\vec{M}_f + \vec{H}_t$. Hitherto, the polarization was typically made such that the angle between the axis of easy magnetization and the magnetization vector was approximately 45°. At this value, point D is situated nearly at the center of segment O-A and corresponds substantially to the change of curvature on the corresponding side of curve 30. Under these conditions, an alternating sinusoidal change in amplitude $H_1$ causes the resistance R to change about point D, between points B' and C', by $\Delta R_1$ and $\Delta R_2$, which results at terminals 10a and 10b in the appearance of an alternating voltage conforming to the waveform 31 shown in FIG. 5. The amplitudes $V_1$ and $V'_1$ correspond to changes $\Delta R_2$ and $\Delta R_1$, respectively. It can be seen that it is at point D that the sensitivity and linearity of the magnetoresistor are at their best. This explains why the prior art manner of polarization was selected.

However, when the amplitude of the exciting field H is high and exceeds the value of the translatory field $H_t$, as is indicated by the field $H_2$ shown in FIG. 4, the resistance R then varies in the part of the curve lying points E and F and the resulting voltage follows curve 32 with a resultant distortion as shown. To this end, since point F is beyond point A' during the negative half-cycle of field $H_2$, the resistance will increase from D to A' (by $\Delta R'_2$), will decrease from A' to F (by $\delta R$), will increase again from F to A' and will decrease from A' to D. The resulting positive half-cycle of the voltage at the terminals of the magnetoresistor will thus contain a trough ($V_2-V'_2$) at the top which is larger the higher the amplitude of field $H_2$. Conversely, the change in resistance between D and E produces a negative half-cycle of voltage without a trough.

All the consequences of the distortion of the signals which results from the prior art manner of polarization will be more clearly appreciated if reference is made to FIGS. 1, 3C and 3D.

It will be assumed that the carrier 11 which is introduced into apparatus 10 is that illustrated in FIG. 3C and that the separation e between the magnetic layer 22 and the outer surface of the magnetoresistor 16 is of the value $e_1$ indicated in FIG. 3C. With a separation of this size, the signal emitted at the output terminals 10a and 10b of the apparatus 10 is assumed to be the signal 33 shown in broken lines in FIG. 3D. As to the processing unit 19, the data detected by the apparatus 10 is generally recognized by a threshold detection device 34 followed by a device 35 for measuring the length of the detected signals. As illustrated in FIGS. 3A to 3D, this length does in fact determine the type of cell detected. In unit 19 the threshold device 34 is intended to distinguish the useful signal from all the interference signals which may exist, meaning that selectivity is better the higher the threshold level. However, let one consider the processing of signal 33 (FIG. 3D).

Like waveform 32 (FIG. 5), this signal has a positive half-cycle containing two peaks of level S1 and a trough of level $S_0$ when the magnetoresistor 16 is in alignment with a cell 25 whose external field 27 is negative, a negative half-cycle of amplitude S2 at the time of passage of a half-cell 26a whose external field 27' is positive, a positive half-cycle of amplitude S3 at the time of passage of a half-cell 26b whose external field 27' is negative, and a negative half-cycle whose amplitude is S4 at the time of passage of a cell 25 whose external field 27 is positive. If the level of the positive threshold of the threshold device 34 of unit 19 is set between the values S3 and S0, all the positive half-cycles can be detected, but because of the troughs in the positive half-cycles corresponding to cells 25, the measuring device 35 will measure the length of the two peaks and will confuse them with a positive peak corresponding to cells 26. It is therefore necessary for the threshold to be lower than the value $S_0$. Another solution which would overcome this confusion would be to increase the separation e and to give it a value $e_2$ as indicated in FIG. 3C. Such an increase in the separation e is in fact reflected by a reduction in the strength of the external fields 27, 27' received by magnetoresistor 16. In this way it is possible to obtain the signal 36 shown in FIG. 3D. It will be assumed that, for the best results, the separation $e_2$ is so adjusted that the maximum exciting field H is equal at the most to the value of the translatory field $H_t$ indicated in FIG. 4. Thus, the signal 36 has a positive half-cycle of amplitude S'1 equal to S1 at the time of passage of a cell 25 whose field 27 is negative, a negative half-cycle of amplitude S'2 at the time of passage of a cell 26 whose field 27 is positive, a positive half-cycle of amplitude S'3 at the time of passage of a cell 26 whose field 27 is negative, and a negative half-cycle of amplitude S'4 at the time of passage of cell 25 whose field 27 is positive. Note should be taken of the relatively large difference between amplitudes S'1 and S'3 on the one hand and S'2 and S'4 on the other. This is due to the fact that when the separation is changed from $e_1$ to $e_2$, there is only a small reduction in the influence of the fields 27 on the magnetoresistor 16 as compared with that exerted by fields 27'. The small amplitude of the half-cycles corresponding to fields 27' thus makes it necessary to set the threshold levels for device 34 between the values S'3 and S'2. By the same token, the processing of the signals which is performed by unit 19 becomes far more sensitive to interference signals. Also, it can be seen from FIG. 3C that at level $e_2$ the transitions between adjoining fields are much less sharply defined than at level $e_1$. What this means in fact is that the half-cycles of signal 36 level out in the vicinity of the time axis t. The poor definition of the passages through zero which results also detracts from the measurements of the duration of the half-cycles which are made by device 35 in block 19.

The shortcomings of 45° polarization may thus be summarized as follows. When the signals received by magnetoresistor 16 are too strong, the signal is distorted by the appearance of troughs in certain half-cycles, but on the other hand the passages through zero are well defined and the amplitudes of half-cycles of the same sign are approximately equal. From signal 33 it can in fact be seen that the peak-to-peak amplitudes defined by segments S1 to S4 and S3 to S2 are in a ratio substantially less than one. This ratio defines the resolution of apparatus 10 when reading. Unfortunately, the maximum advantage cannot be taken of this characteristic with the prior art manner of polarization. In addition, when the troughs are cancelled out while maintaining the polarization at 45°, it can be seen that the resolution of signal 36 is appreciably reduced (resolution in this case being the ratio between segments S'1 to S'4/S'3 to S'2) as also is the definition of the passages through zero. In both cases, the use of the signals ready by a magnetoresistor polarized at 45° is subject to limitations which make decoding difficult and unreliable.

The invention consists in modifying the polarization as illustrated in FIGS. 6 and 7, to enable a signal such as the signal 37 shown in FIG. 3D to be obtained.

FIG. 7 is a graph similar to that in FIG. 4 and by way of illustration it again contains the curve 30 representing the prior art polarization at 45°. It is also assumed that the same exciting field $H_2$ is applied to the magnetoresistor. Consequently, the points E and F on curve 30 which are shown in FIG. 7 coincide with the same points in FIG. 4, as also do the changes in resistance $\Delta R'_1$, $R'_2$ and $\delta R$. The curve 38 in FIG. 7 results from the polarization which is performed in accordance with the invention by means of a translatory field $H'_t$.

If it is assumed, as is the case with the example cited above with reference to FIGS. 3A to 3D, that the magnetic signal of modulus $H_2$ is the result of the vector sum of, on the one hand, the maximum external magnetic signal which the magnetoresistor 16 is able to receive when it is spaced from the carrier 11 by a separation $e_1$ and, on the other hand, the demagnetizing magnetic field set up by the magnetoresistor in response to the said maximum external magnetic field, the polarization adopted in accordance with the invention is such that the translatory field $H'_t = H_2$. The polarization point D' is thus situated lower on the magnetoresistor curve than the previous polarization point D, which amounts to saying that the magnetization vector M' forms an angle $\alpha < 45°$ with the axis of easy magnetization $\vec{M}_f$ of the magnetoresistive material, by virtue of the adoption of a translatory field $H'_t$ which is higher than the translatory field $H'_t$ involved in the prior art polarization as shown in FIG. 6. In this way the field $-H_2$ has corresponding to it on curve 38 the point F' corresponding to the apex A" of curve 38. There is thus no longer any distortion as a result of the formation of troughs in the read signal, as can be seen from curve 37 in FIG. 3D. This curve also shows that the amplitudes of the half-cycles of signal 37 are higher than in the case of the signal which results from the same external signal but with 45° polarization. FIG. 7 does in fact show that the changes in resistance $\Delta R''_1$ and $\Delta R''_2$ are considerably greater than the corresponding changes taken from curve 30. It will also be seen that amplitudes $S''_1$ and $S''_4$ are very close to amplitudes $S''_3$ and $S''_3$, respectively, which amounts to saying that the resolution of the apparatus 10 according to the invention is virtually equal to one.

To sum up, curve 37 shows the high standard of reading performed in accordance with the invention. The data carrier may be read at a very small separation $e_1$ without distortion in the signal. The passages of this signal through zero are distinct, while the amplitude of the half-cycles reaches a high and substantially constant level despite the differing fields 27 and 27'. As a result, the detection thresholds of the device 34 (FIG. 1) can now be set at levels which are just below levels $S''_3$ and $S''_2$, respectively. Since these levels are very high, the device 34 gives reliable results while not being susceptible to interference signals, while the measuring device 35 is in a position reliably to select the long and short intervals which will be used to determine the items of 0 and 1 information in the message read.

It should also be noted that the higher the translatory field $H''_t$ the lower the "altitude" of the polarization point D' along the side of the magnetoresistance curve. Now, it can be seen in particular from FIG. 7 that the gradient of the corresponding side is shallower the lower is this point. As a result, any interference signal which oscillates about such a polarization point will be detected by the magnetoresistor with a detection co-efficient (as represented by the gradient of this point) which is less than the detection co-efficient for the useful signal at a higher level on the curve. In other words, this detection will have the advantage of reducing still further the signal to noise ratio while in addition it has been seen that the detection thresholds for the useful signal 37 may be set at a higher level.

In a preferred embodiment of the invention, the method of reading consists in determining the maximum desired value of the external magnetic fields to which the magnetoresistive device will be subjected, and adjusting the angle of polarization to a value corresponding substantially to the modulus of the sum of the said maximum desired value of the external magnetic fields and the magnitude of the demagnetizing magnetic field which is set up by the magnetoresistor device in response to the said external magnetic field having the said maximum desired value.

To enable this to be done, the apparatus 10 may be provided with a polarization adjusting device adjusted once and for all at the time of construction as a function of the kind of carrier 11 to be read. However, with the adjusting device 20 the apparatus 10 is capable of more flexible operation where it is adaptable to carriers 11 of various kinds.

As an example, if the apparatus 10 is of the kind described in the above-mentioned application Ser. No. 899,217, now U.S. Pat. No. 4,184,631, the angle of polarization may be adjusted in accordance with the invention by varying the distance d between the polarizing unit 17 and the magnetoresistor 16. The correct distance d for a given separation e and a given type of substrate may be fixed at the time of construction or may be adjustable by means of the device 20.

It has also been seen that the separation e determines the value of the modulus of the external fields emitted by the magnetic layer 22 of a substrate 11. The device 20 may be constructed in such a way as to enable this distance e to be adjusted.

However, for a given distance d and a given separation e, the angle of polarization may be determined by adjusting the strength of the magnetic polarizing field $H_p$ emitted by unit 17.

It is thus apparent that the angle of polarization may be adjusted in accordance with the invention by varying, separately or in combination, the strength of the polarizing field $H_p$ at emission, the distanced d separating the polarizing unit from the magnetoresistive device, and the distance e separating this device from the magnetic layer 22 on a carrier 11. Thus, the adjusting device 20 may be, depending upon which of the abovementioned cases is concerned, a potentiometer for adjusting the electrical current which generates the polarizing field $H_p$, if the latter is generated electrically, a screw for relatively positioning unit 17 and magnetoresistor 16, by sliding on rails, for example, and/or a screw which enables the separation e to be adjusted, by acting, for example, on a non-magnetic plate which is positioned between the magnetoresistor 16 and the carrier 11 and against which the carrier would pass to be read. It is clear that these examples are not limiting.

It should be remembered that the invention is not restricted to the reading of dual frequency (Aiken) coded data and that it may advantageously be adapted to the reading of magnetic data coded in any form whatever, for example, in the CMC7 or E13B codes.

In other words, the invention is in no way restricted to the example described and illustrated and in fact covers all means which are technical equivalents of the means described, as well as combinations of these if the combinations are made and fall with the true spirit and scope of the invention as defined in the accompanying claims.

What is claimed is:

1. A method of reading data defined by a plurality of magnetic elements which emit respective predetermined external magnetic fields consisting in subjecting an anisotropic magnetoresistive device carrying a substantially constant electrical current to the effect of the external magnetic fields, polarizing the said magnetoresistive device by a magnetic polarizing field in such a way that the direction of magnetization and the axis of easy magnetization of the magnetoresistive material of the said device form a given angle between them, defining the maximum desired value of the said external magnetic fields to which the said magnetoresistive device will be subjected, and making the value of the said angle correspond substantially to the modulus of the sum of the said maximum desired value of external magnetic field and the magnitude of the demagnetizing magnetic field which is set up by the said magnetoresistive medium in response to the said external magnetic field having the said maximum desired value.

2. A method according to claim 1 wherein the maximum received magnetic field is defined as a function of the distance separating the magnetoresistive medium from the said magnetic elements, and of the nature of the materials forming the said elements and the said magnetoresistive device.

3. Apparatus for reading data defined by a plurality of magnetic elements carried by a data carrier which emits respective predetermined external magnetic fields corresponding to the said data, comprising a source of substantially constant electrical current, at least one anisotropic magnetoresistive reading device which is coupled to the said source to react to magnetic exciting fields each determined by the vector sum of one of the said external fields which is received by the said magnetoresistive device and the demagnetizing magnetic field which is set up by the device in response to the said external magnetic field, and whose resistance normally varies, as a function of the said exciting fields, in accordance with a bell curve which is symmetrical with reference to the sign of the said exciting fields, a polarizing means adapted to emit a magnetic polarizing field and disposed to apply this field to the said magnetoresistive device in such a way as to shift the said curve in translation along the axis carrying the values of the said exciting fields by a value of magnetic field corresponding substantially to the maximum value of the modulus of the said exciting fields to which the magnetoresistive device is capable of reacting.

4. Apparatus according to claim 3, wherein the said polarizing means includes a means for adjusting the modulus of the said polarizing field.

5. Apparatus according to claim 3 or 4, wherein the said polarizing means includes a means for adjusting the polarizing field which is exerted on the said magnetoresistive device.

6. Apparatus according to claims 3 or 4 wherein the polarizing means includes a means for adjusting the distance separating the magnetoresistive device from the said magnetic elements on the said data carrier.

7. Apparatus according to claim 5 wherein the polarizing means includes a means for adjusting the distance separating the magnetoresistive device from the said magnetic elements on the said data carrier.

* * * * *

UNITED STATES PATENT AND TRADEMARK OFFICE
CERTIFICATE OF CORRECTION

PATENT NO.   :   4,246,474

DATED        :   January 20, 1981

INVENTOR(S)  :   LAZZARI, Jean-Pierre

It is certified that error appears in the above-identified patent and that said Letters Patent are hereby corrected as shown below:

In item (73)   "Compagnie Internationale pour l'Informatique" should be -- Compagnie Internationale pour l'Informatique CII-Honeywell Bull (Societe Anonyme) --.

*Signed and Sealed this*

*Twenty-fourth* Day of *March 1981*

[SEAL]

*Attest:*

RENE D. TEGTMEYER

*Attesting Officer*   *Acting Commissioner of Patents and Trademarks*